US008106362B2

(12) United States Patent
Shirakawa

(10) Patent No.: US 8,106,362 B2
(45) Date of Patent: Jan. 31, 2012

(54) SURFACE CONTAMINATION EXAMINING DEVICE AND METHOD

(75) Inventor: Yoshiyuki Shirakawa, Chiba (JP)

(73) Assignee: National Institute of Radiological Sciences, Chiba (JP)

( * ) Notice: Subject to any disclaimer, the term of this patent is extended or adjusted under 35 U.S.C. 154(b) by 442 days.

(21) Appl. No.: 12/438,816

(22) PCT Filed: Mar. 30, 2007

(86) PCT No.: PCT/JP2007/057184
§ 371 (c)(1),
(2), (4) Date: Feb. 25, 2009

(87) PCT Pub. No.: WO2008/047487
PCT Pub. Date: Apr. 24, 2008

(65) Prior Publication Data
US 2009/0294669 A1  Dec. 3, 2009

(30) Foreign Application Priority Data
Oct. 17, 2006 (JP) ................................. 2006-282182

(51) Int. Cl.
*G01T 1/24* (2006.01)
(52) U.S. Cl. .............................. 250/370.08; 250/370.09
(58) Field of Classification Search .................. 250/308, 250/370.09, 370.08
See application file for complete search history.

(56) References Cited

U.S. PATENT DOCUMENTS

| 3,833,809 A * | 9/1974 | Beil ........................... 250/269.8 |
| 4,665,486 A * | 5/1987 | Schultz ............................ 702/8 |
| 2004/0015075 A1* | 1/2004 | Kimchy et al. ............... 600/424 |
| 2004/0079882 A1* | 4/2004 | Bullen ......................... 250/308 |

FOREIGN PATENT DOCUMENTS

| JP | 02-259588 | 10/1990 |
| JP | 06-064714 | 3/1994 |

(Continued)

OTHER PUBLICATIONS

International Search Report issued in corresponding application No. PCT/JP2007/057184, completed Jun. 18, 2007 and mailed Jun. 26, 2007.

*Primary Examiner* — David Porta
*Assistant Examiner* — Casey Bryant
(74) *Attorney, Agent, or Firm* — Griffin & Szipl, P.C.

(57) ABSTRACT

A surface contamination examining device includes a radiation detector 11 and an arithmetic/display device 13 for displaying radiation intensity in form of a counting rate. The arithmetic/display device has a boundary detecting device 10 that detects the boundary of contamination 14 of an object to be measured by a radioactive material while the radiation detector moves along a surface 18 of the object to be measured. The boundary detecting device 10 includes a counting rate storage unit that sequentially stores counting rates $Y_i$ at a predetermined time interval, a slope arithmetic unit that computes slopes $a_M$ and $a_N$ of approximation lines from previous M (where M is an integer of 3 or larger) counting rates $Y_i$ including a final counting rate $Y_M$ and previous N (where N is an integer smaller than M) counting rates $Y_i$ including the final counting rate $Y_M$, and a boundary determining unit that determines the boundary of contamination of the object to be measured by the radioactive material on the basis of lines of slope $a_M$ and $a_N$.

8 Claims, 15 Drawing Sheets

FOREIGN PATENT DOCUMENTS

| | | | |
|---|---|---|---|
| JP | 06066946 A * | 3/1994 | |
| JP | 06-148334 | 5/1994 | |
| JP | 06-324150 | 11/1994 | |
| JP | 07-159542 | 6/1995 | |
| JP | 10-197544 | 7/1998 | |
| JP | 2001-228256 | 8/2001 | |
| JP | 2006-177883 | 7/2006 | |

* cited by examiner

SURFACE CONTAMINATION EXAMINING DEVICE AND METHOD

BACKGROUND OF THE INVENTION

1. Technical Field of the Invention

The present invention relates to surface contamination examining device and method that examine surface contamination by a radioactive material.

2. Description of the Related Art

Patent Documents 1 to 6 disclose a device for examining surface contamination by a radioactive material in nuclear facilities.

Patent Document 1 discloses a "radiation monitor" that automatically sets an optimum contamination counting time depending on a change of background. The radiation monitor transports an object to be measured on a conveyor and determines a contamination state of the object to be measured. As shown in FIG. 1, the radiation monitor includes a background measuring unit 114 that measures a background level, a counting time deciding unit 115 that finds a contamination counting time, which puts a true counting value having no background into a contamination control level, on the basis of the measurement value by the background measuring unit 114 and a prescribed contamination control level, and a speed control unit 111 that controls the speed of the conveyor in accordance with the contamination counting time decided by the counting time deciding unit 115.

Patent Document 2 discloses a "goods transport monitor" that improves workability of contamination examination of goods to be transported. The goods transport monitor transports goods 133 to be examined into a monitor main body 120 by an automatic transport path 123, measures the dose of radiation emitted from the goods 133 to be examined by a radiation detector 129 in the monitor main body 120, and monitors presence/absence of contamination of the goods 133 to be examined on the basis of the measurement value. As shown in FIG. 2, the goods transport monitor includes a stability detecting unit 126 that is provided near to the automatic transport path 123 on a goods insertion side of the monitor main body 120, and a transport speed control unit 131 that adjusts a transport speed of the goods to be examined in accordance with the stability of the goods 133 to be examined detected by the stability detecting unit 126.

Patent Document 3 discloses "surface contamination examining device and method" that efficiently and automatically determine presence/absence of radiation contamination of an object to be measured while being moved, and accurately and efficiently measure the contamination of the object to be measured with high reliability as occasion demands. As shown in FIG. 3, the surface contamination examining device includes a radiation detecting unit 223 that measures the dose of radiation to be emitted while changing a part to be measured according to movement of an object 211 to be measured, a monitoring and determining unit 220 that monitors an upward trend of a measurement value from the radiation detecting unit 223, and a motor speed control unit 218 that, when the upward trend of the measurement value is recognized by the monitoring and determining unit 220, controls a conveyor driving motor to reduce or change a conveyor speed or to stop a conveyor. When the upward trend of the measurement value is recognized by the monitoring and determining unit 220, the conveyor speed is reduced or the conveyor is stopped to measure the dose of emission radiation from the object 211 to be measured and determine presence/absence of contamination of the object to be measured.

Patent Document 4 discloses a "radiation monitor" that promptly and reliably detects an abnormal increase of a radiation level in an initial stage, and promptly takes a countermeasure. Referring to FIG. 4, as for a data processing for detecting an increase in the radiation level, N is acquired at every predetermined time t, latest data at each time is set to $N_1$, and a new counting time band $T_s$ including $N_1$ at each counting and a previous old counting time band $T_b$ are set. An increase level counting rate n which is a difference between counting rates $n_s$ and $n_b$ is obtained, and an increase level determination value a is obtained by using a relational expression of a statistical error in the measurement of the counting rate n. The counting rate n and the determination value a are compared with each other. When the counting rate n is larger than the determination value a, a forecasting alarm is operated. When the counting rate n is smaller than the determination value a, the time band $T_s$ is extended, the old counting time band $T_b$ is shifted forward by the extended portion of the time band $T_s$. Similarly, the increase level counting rate n and the increase level determination value a are obtained and compared with each other, and a forecasting determination is performed. This processing is repeatedly performed until the time band $T_s$ reaches a prescribed time band $T_{max}$. The same processing is sequentially performed at a next count t after the time band $T_s$ reaches the time band $T_{max}$. Patent Document 5 discloses a "radiation measuring device" that, in a surveymeter, efficiently specifies a contaminated part without being captivated by background. Referring to FIG. 5, if a detection pulse 300 is output from a wave-height discriminator 314, a pulse 302 having a predetermined width T is output from a one shot multivibrator 316. If another detection pulse 300 is generated outside the width T, it is determined as background by AND circuits 318 and 320, and a detection pulse other than the background is output as a measurement result.

Patent Document 6 discloses a "detector with visual display in a surveymeter" which, when radioactive contamination is measured by a surveymeter of a type with a detector and a measuring device separated, is capable of measuring presence/absence of radioactive contamination without requiring frequent motions of eyes and without generating click sound to acoustically inform a level of contamination, and in which visual display is turned on/off when a radioactive measurement value exceeds a control reference value. Referring to FIG. 6, in a surveymeter of a type with a detector and a measuring device separated, a visual display unit having one or a plurality of illuminants 303 is set to a part, such as a rear surface of a hold portion 304 of the detector, in which a measurer visually recognizes with ease. The illuminants 303 are turned on/off in synchronization with radiation pulses input to a scintillator 301 of the detector.

[Patent Document 1] Japanese Patent Application Laid-Open No. 6-148334, "Radiation Monitor"

[Patent Document 2] Japanese Patent Application Laid-Open No. 6-64714, "Goods Transport Monitor"

[Patent Document 3] Japanese Patent Application Laid-Open No. 18-177883, "Surface Contamination Examining Device and Method"

[Patent Document 4] Japanese Patent Application Laid-Open No. 6-324150, "Radiation Monitor"

[Patent Document 5] Japanese Patent Application Laid-Open No. 10-197644, "Radiation Measuring Device"

[Patent Document 6] Japanese Patent Application Laid-Open No. 13-228256, "Detector with Visual Display in Surveymeter"

As described above, in the known devices for detecting surface contamination by a radioactive material, like Patent Document 1, the optimum contamination counting time is automatically set according to the change of background. In addition, like Patent Document 2, the examination speed of the object to be measured is adjusted to improve workability, and like Patent Document 3, the examination mode of the object to be measured varies depending on the reliability factor.

Like Patent Document 4, presence/absence of contamination is found in the initial stage on the basis of an increase rate of the counting rate from various time bands obtained measurement data.

Like Patent Document 5, background or contamination is determined according to a time interval at which a detection pulse comes.

Like Patent Document 6, the control reference value is provided, and the illuminants are turned on/off when the radioactive measurement value exceeds the control reference value.

A surveymeter used in the known examining devices has a radiation detector that detects radiation, and an arithmetic/display device that processes an output pulse from the radiation detector and displays radiation intensity (for example, displays a counting rate: cpm). However, as shown in FIG. 7, when a response approximates as a primary delay system, and a time constant indicative of the response is set to 10 seconds, even if the surveymeter is stationary at the same position and performs measurement, it takes a time, for example, strictly 60 seconds or typically 30 seconds, which is three times larger than the time constant, to reach an actual radiation intensity.

For this reason, in the known examining devices, the time constant of the surveymeter is changed to 3 seconds, and thus a detection time of presence/absence of contamination is shortened. In this case, however, the surveymeter needs to be stationary at the same position around ten seconds.

In order to detect presence/absence of contamination and to grasp the range of contamination, that is, the boundary of contamination (contamination start position and contamination end position), it is necessary to perform the examination while moving the surveymeter over the entire potential contamination range.

In this case, as shown in FIG. 8, the stationary measurement value is high in the vicinity of the contamination range. When detection is performed while the surveymeter is being moved, a detection value at the contamination start position is low due to detection delay, and a detection value at the contamination end position is high due to detection delay. Accordingly, it is impossible to decide the contamination start position and the contamination end position.

For this reason, in accurately grasping the boundary of contamination (the contamination start position and the contamination end position), it is necessary to repeatedly reciprocate or stop many times in the vicinity of the contamination. As a result, it takes a lot of time to specify a contaminated location.

SUMMARY OF THE INVENTION

The invention has been finalized in order to solve the above-described problems. That is, it is an object of the invention to provide surface contamination examining device and method that are capable of rapidly and accurately specifying the boundary (contamination start position and contamination end position) of contamination of an object to be measured, without repeating reciprocation or stop in the vicinity of the boundary.

Means for Solving the Problems

According to the invention, a surface contamination examining device includes a radiation detector that detects radiation, and an arithmetic/display device that processes an output pulse from the radiation detector and displays radiation intensity in the form of a counting rate. The arithmetic/display device has a boundary detecting device that detects the boundary of contamination of an object to be measured by a radioactive material when the radiation detector moves along a surface of the object to be measured at a substantially constant speed.

According to a preferred embodiment of the invention, the boundary detecting device may include a counting rate storage unit that sequentially stores the counting rate $Y_i$ (where i=1, 2, 3, . . . , L: L is an integer of 3 or larger) at a predetermined time interval, a slope arithmetic unit that computes slopes $a_M$ and $a_N$ of approximation lines from M (where M is an integer of 3 or larger) counting rates $Y_i$ in a predetermined range and N (where N is an integer smaller than M) counting rates $Y_i$ from among the M counting rates $Y_i$, and a boundary determining unit that compares the slopes $a_M$ and $a_N$ to determine the boundary of contamination of the object to be measured by the radioactive material.

The predetermined time interval may be a uniform interval.

The boundary determining unit may compute a slope difference $\Delta a = a_N - a_M$, when the slope difference $\Delta a$ exceeds a predetermined positive threshold value, determine a corresponding position as a contamination start position, and when the absolute value of the slope difference $\Delta a$ exceeds a predetermined negative threshold value, determine a corresponding position as a contamination end position.

The surface contaminating examining device may further include a display device that displays the position of the boundary of contamination of the object to be measured.

The display device may be a light emitter and/or an alarm.

According to the invention, a method of examining surface contamination includes moving a radiation detector for detecting radiation along a surface of an object to be measured at a substantially constant speed, processing an output pulse from the radiation detector and outputting radiation intensity in the form of a counting rate, and detecting the boundary of contamination of the object to be measured by a radioactive material on the basis of a change in the counting rate.

According to a preferred embodiment of the invention, the detecting of the boundary may include sequentially storing counting rates $Y_i$ (where i=1, 2, 3, . . . , L: L is an integer of 3 or larger) at a predetermined time interval, computing slopes $a_M$ and $a_N$ of approximation lines of M (where M is an integer of 3 or larger) counting rates $Y_i$ in a predetermined range and N (where N is an integer smaller than M) counting rates $Y_i$ from among the M counting rates $Y_i$, and comparing the slopes $a_M$ and $a_N$ to determine the boundary of contamination of the object to be measured by the radioactive material.

The predetermined time interval may be a uniform interval.

In the determining of the boundary, a slope difference $\Delta a = a_N - a_M$ may be computed, when the slope difference $\Delta a$ exceeds a predetermined positive threshold value, a corresponding position may be determined as a contamination start position, and when the absolute value of the slope difference $\Delta a$ exceeds a predetermined negative threshold value, a corresponding position may be determined as a contamination end position.

According to the device and method of the invention, a boundary detecting device is provided to detect the boundary of contamination of an object to be measured by a radioactive material while a radiation detector moves along a surface of the object to be measured at a substantially constant speed. In the moving of the radiation detector, the radiation detector for detection radiation moves along the surface of the object to be measured at a substantially constant speed.

In the outputting of the radiation intensity, an output pulse from the radiation detector is processed and radiation intensity is output in the form of a counting rate.

In the detecting of the boundary, the boundary of contamination of the object to be measured by the radioactive material is detected on the basis of the change of the counting rate. Therefore, it is possible to specify the boundary (contamination start position and contamination end position) of contamination of the object to be measured at a time, without repeating reciprocation or stop in the vicinity of the boundary.

As a result, according to the invention, it is possible to easily and rapidly specify surface contamination by a radioactive material, that is, the boundary between contamination and noncontamination.

DESCRIPTION OF THE PREFERRED EMBODIMENT

Figure 1:
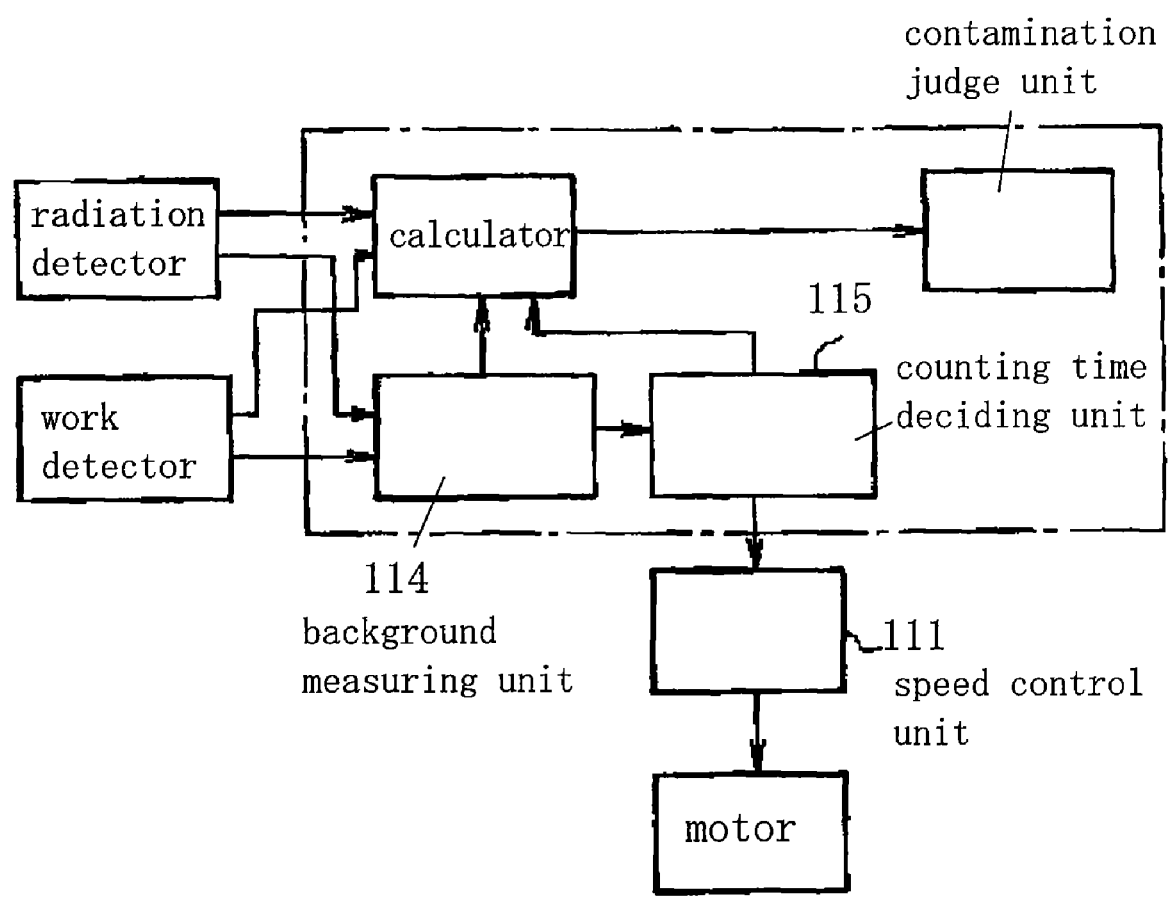
FIG. 1 is a schematic view of a "radiation monitor" of Patent Document 1.
Figure 2:
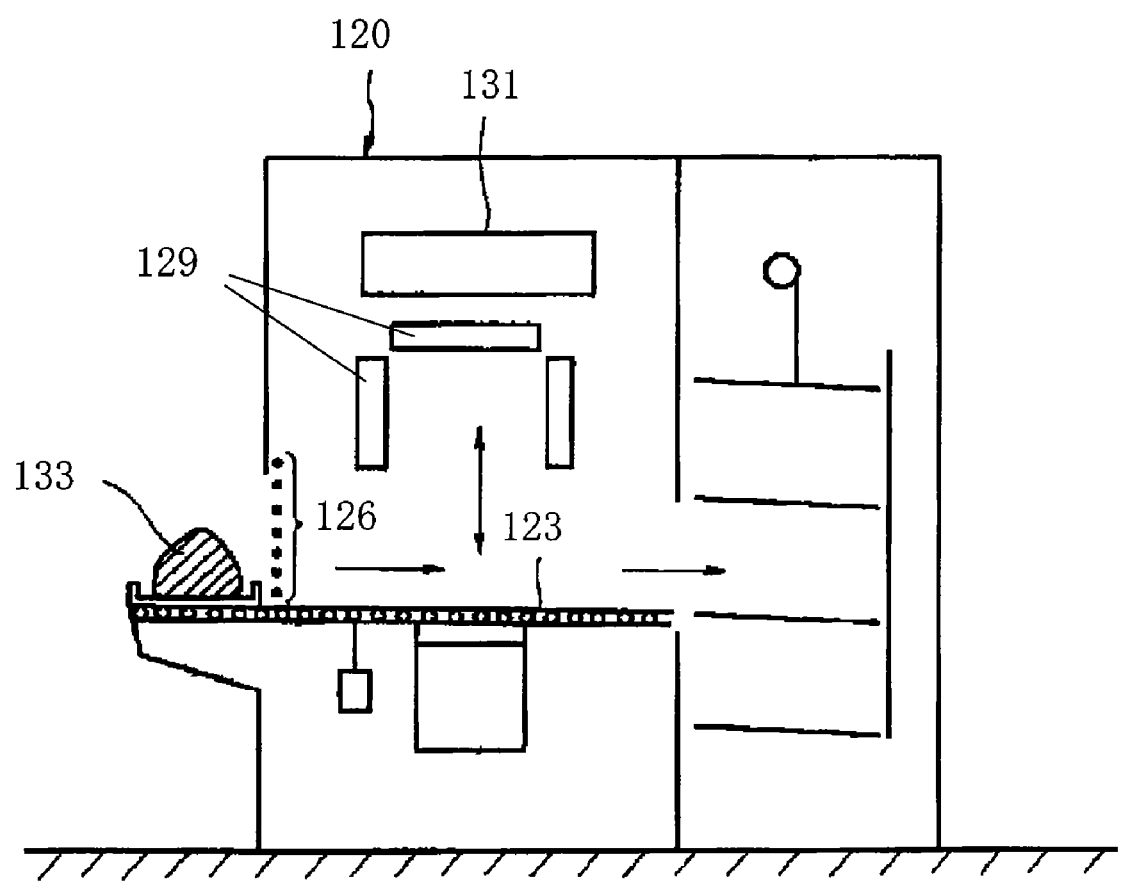
FIG. 2 is a schematic view of a "goods transport monitor" of Patent Document 2.
Figure 3:
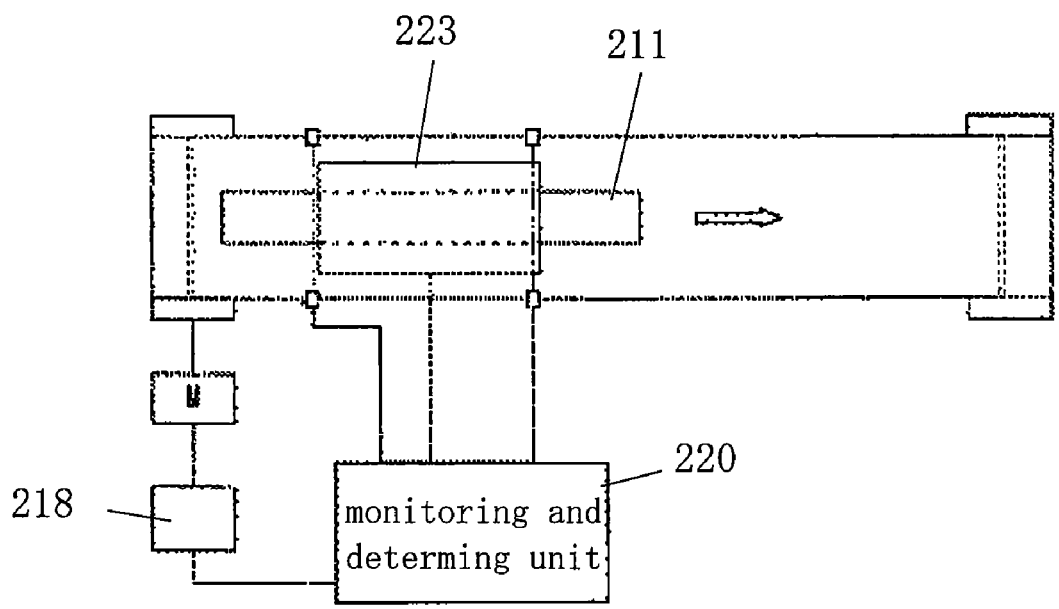
FIG. 3 is a schematic view of a "surface contamination examining device and method" of Patent Document 3.
Figure 4:
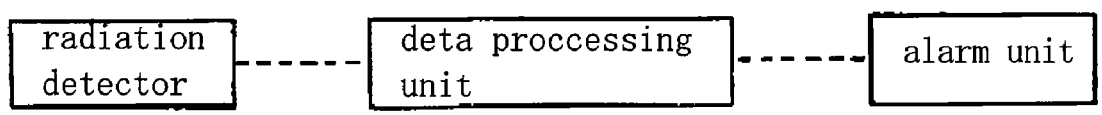
FIG. 4 is a schematic view of a "radiation monitor" of Patent Document 4.
Figure 5:
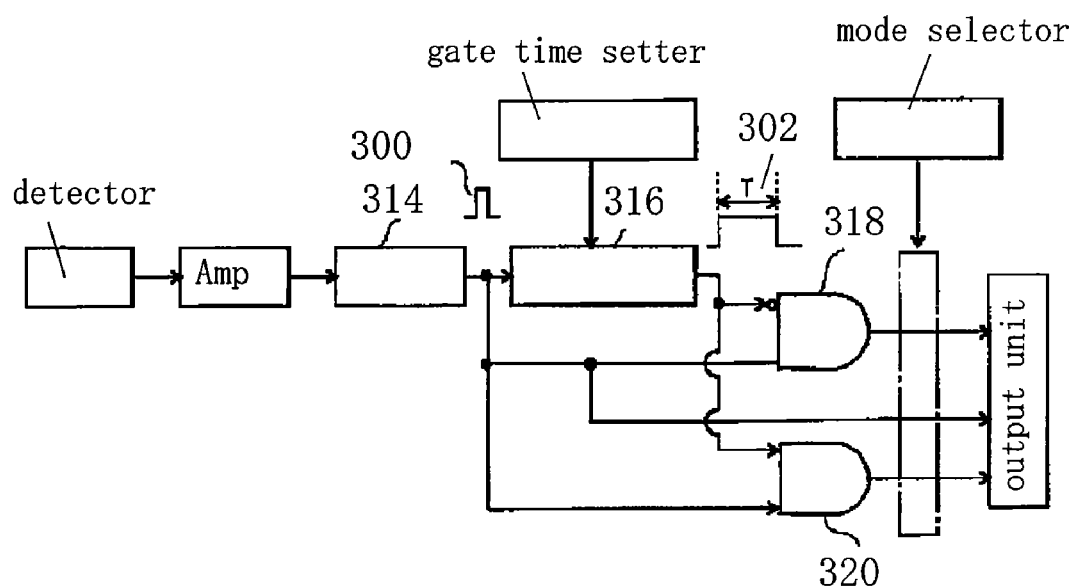
FIG. 5 is a schematic view of a "radiation examining device" of Patent Document 5.
Figure 6:
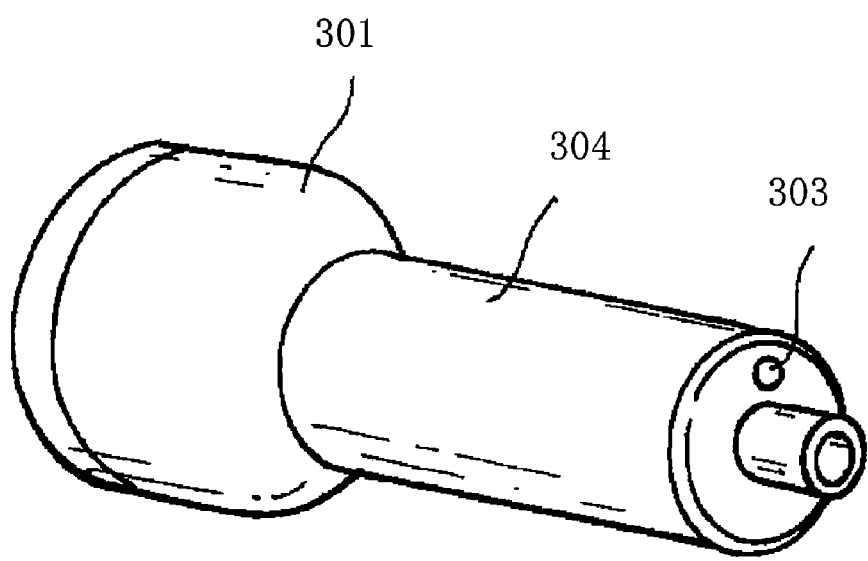
FIG. 6 is a schematic view of a "detector with visual display in a surveymeter" of Patent Document 6.
Figure 7:
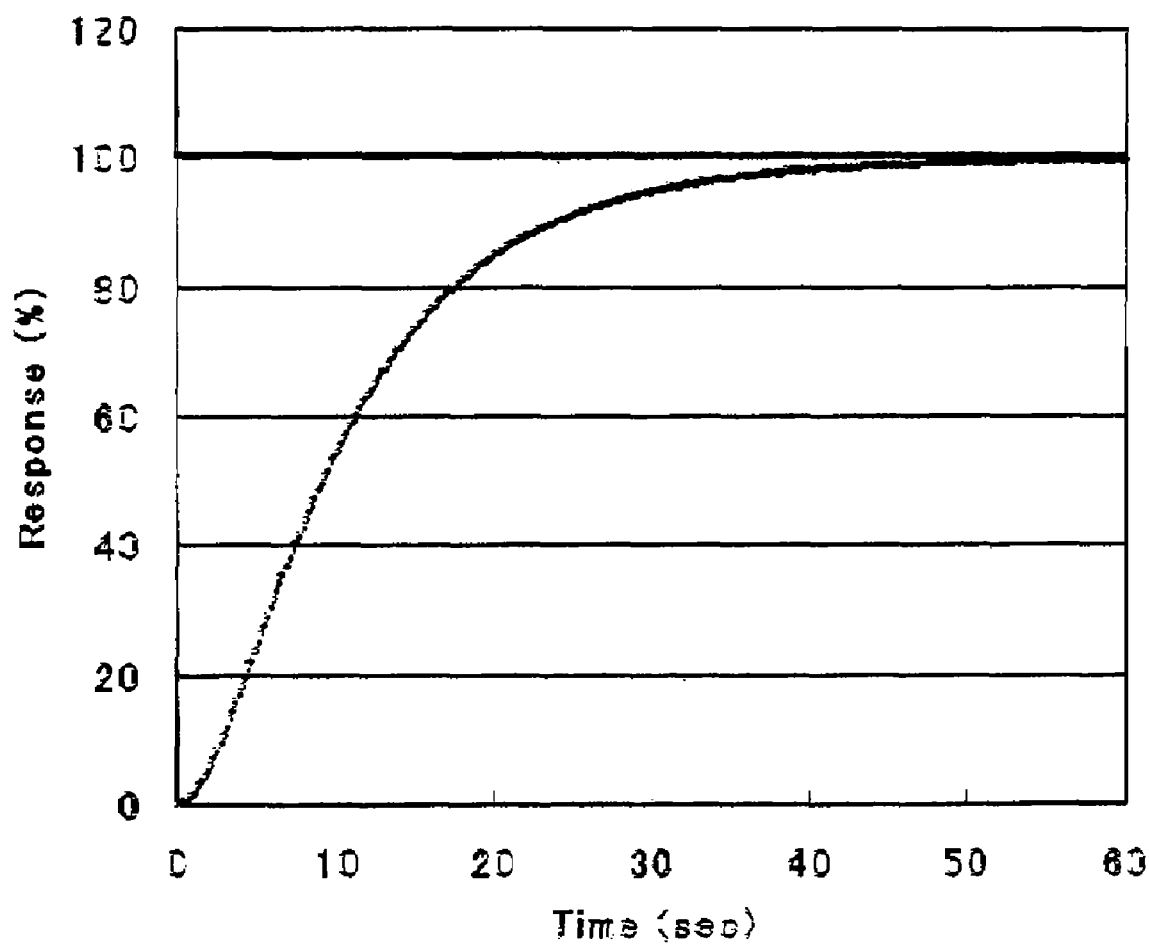
FIG. 7 is a diagram illustrating a response characteristic of a surveymeter.
Figure 8:
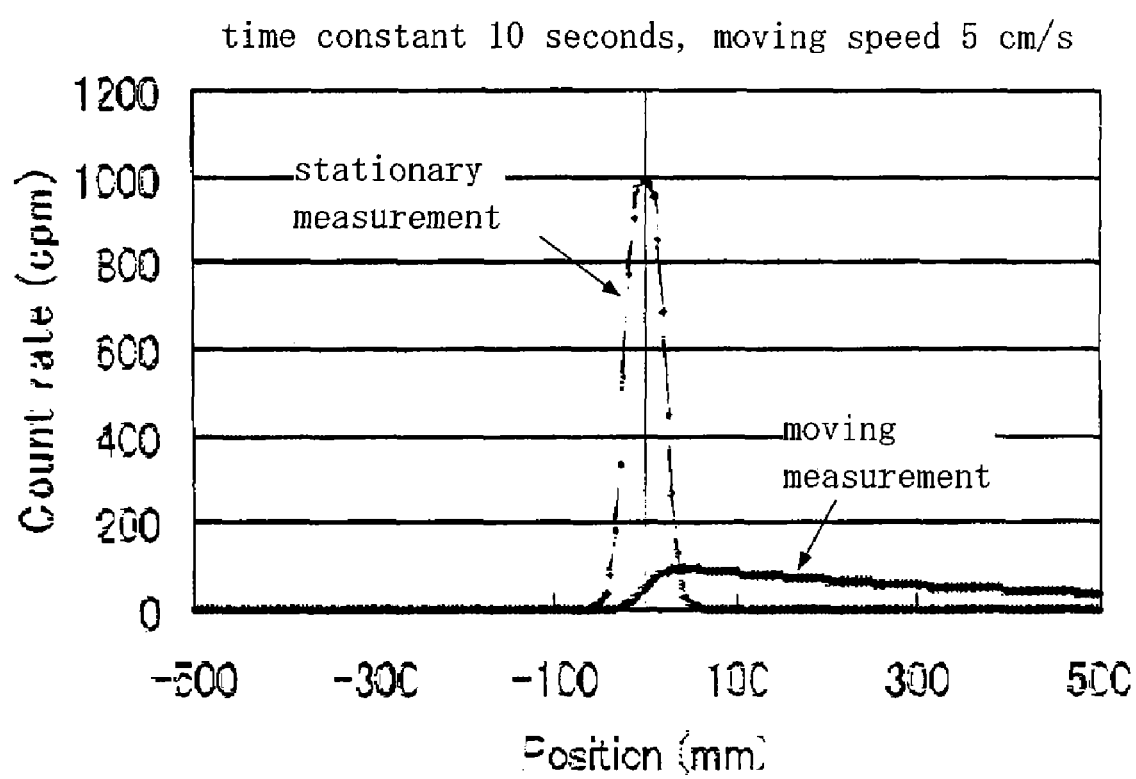
FIG. 8 is a diagram illustrating output characteristics of stationary measurement and mobile measurement.

Hereinafter, a preferred embodiment of the invention will be described with reference to the drawings. In the drawings, like numbers reference like elements, and overlap descriptions will be omitted.

Figure 9:
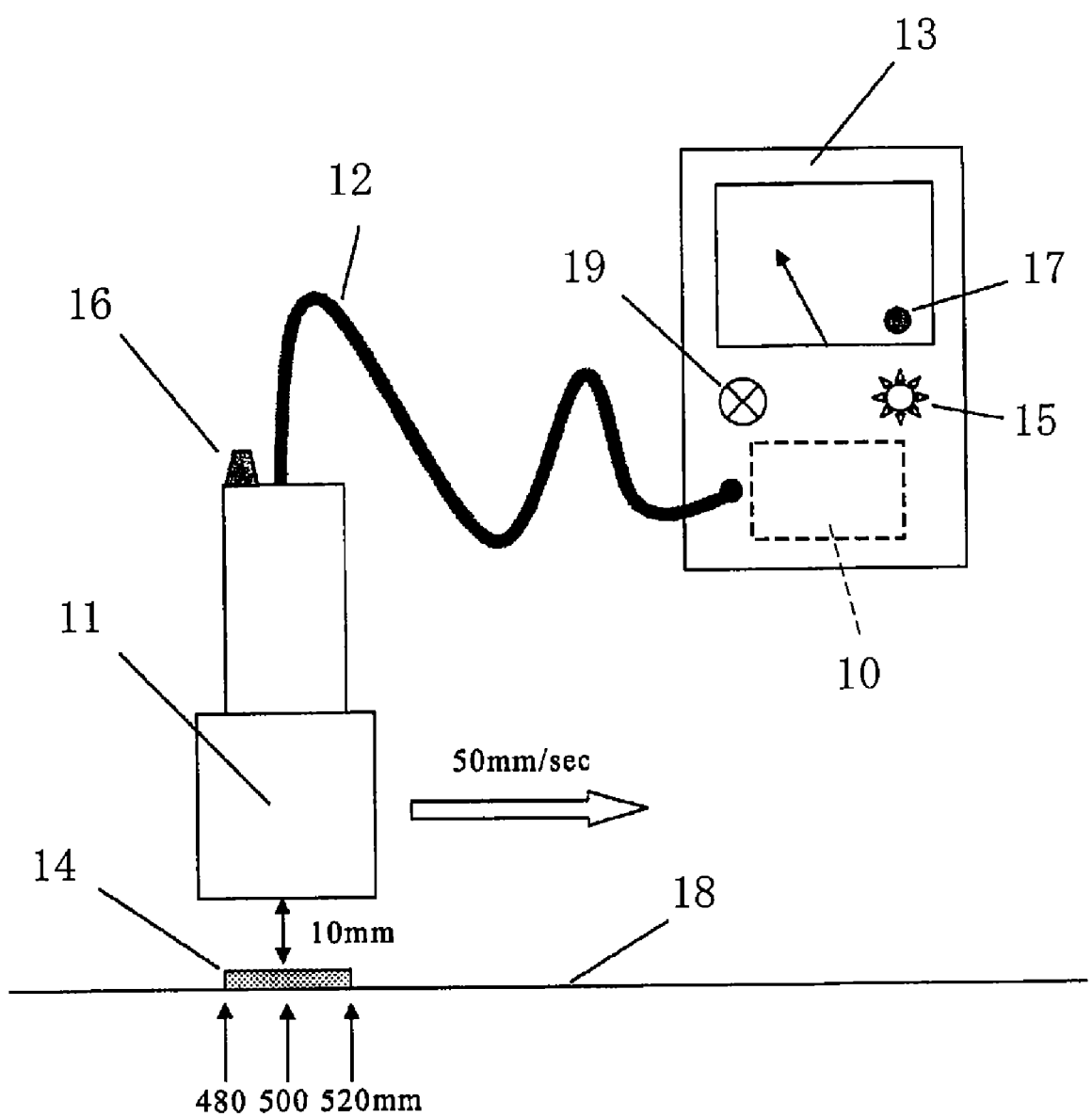
FIG. 9 is an overall configuration diagram of a surface contamination examining device according to the invention.

FIG. 9 is an overall configuration diagram of a surface contamination examining device according to the invention. In FIG. 9, a surface contamination examining device of the invention includes a radiation detector 11, such as a GM surveymeter, which detects β rays, and an arithmetic/display device 13.

The radiation detector 11 detects radiation (for example, β rays). A cable 12 is electrically connected to the radiation detector 11 and the arithmetic/display device 13, and transmits and receives data between the radiation detector 11 and the arithmetic/display device 13. The arithmetic/display device 13 processes an output pulse from the radiation detector 11 and displays radiation intensity in the form of a counting rates $Y_i$ (where i=1, 2, 3, . . . , and L: L is an integer of 3 or larger).

The radiation detector 11 may be handhold and may move along a surface 18 at a predetermined speed (for example, 50 mm/sec) to be spaced at a substantially constant distance (for example, 10 mm) from the surface 18 of the object to be measured. The movement may be conducted manually or by using a moving device (for example, a wheeled carriage). In this case, the wheels of the carriages are preferably provided so as not to come into direct contact with contamination 14 of the object to be measured.

The arithmetic/display device 13 includes a boundary detecting device 10. The boundary detecting device 10 detects the boundary of contamination 14 of the object to be measured by a radioactive material when the radiation detector 11 is moving along the surface of the object to be measured at a substantially constant speed.

The boundary detecting device 10 includes a counting rate storage unit, a slope arithmetic unit, and a boundary determining unit, all of which are not shown. The boundary detecting device 10 is, for example, a microcomputer, the counting rate storage unit is, for example, a RAM, and the slope arithmetic unit and the boundary determining unit are, for example, a computer program.

The counting rate storage unit sequentially stores counting rates $Y_i$ (where i=1, 2, 3, . . . , and L: L is an integer of 3 or larger) at a predetermined time interval (preferably, a uniform interval).

The slope arithmetic unit computes slopes $a_M$ and $a_N$ of approximation lines from previous M (where M is an integer of 3 or larger) counting rates $Y_i$ including a final counting rate $Y_M$ and previous N (where N is an integer smaller than M) counting rates $Y_i$ including the final counting rate $Y_M$.

The boundary determining unit determines the boundary of contamination of the object to be measured by the radioactive material on the basis of the slopes $a_M$ and $a_N$.

Figure 10:
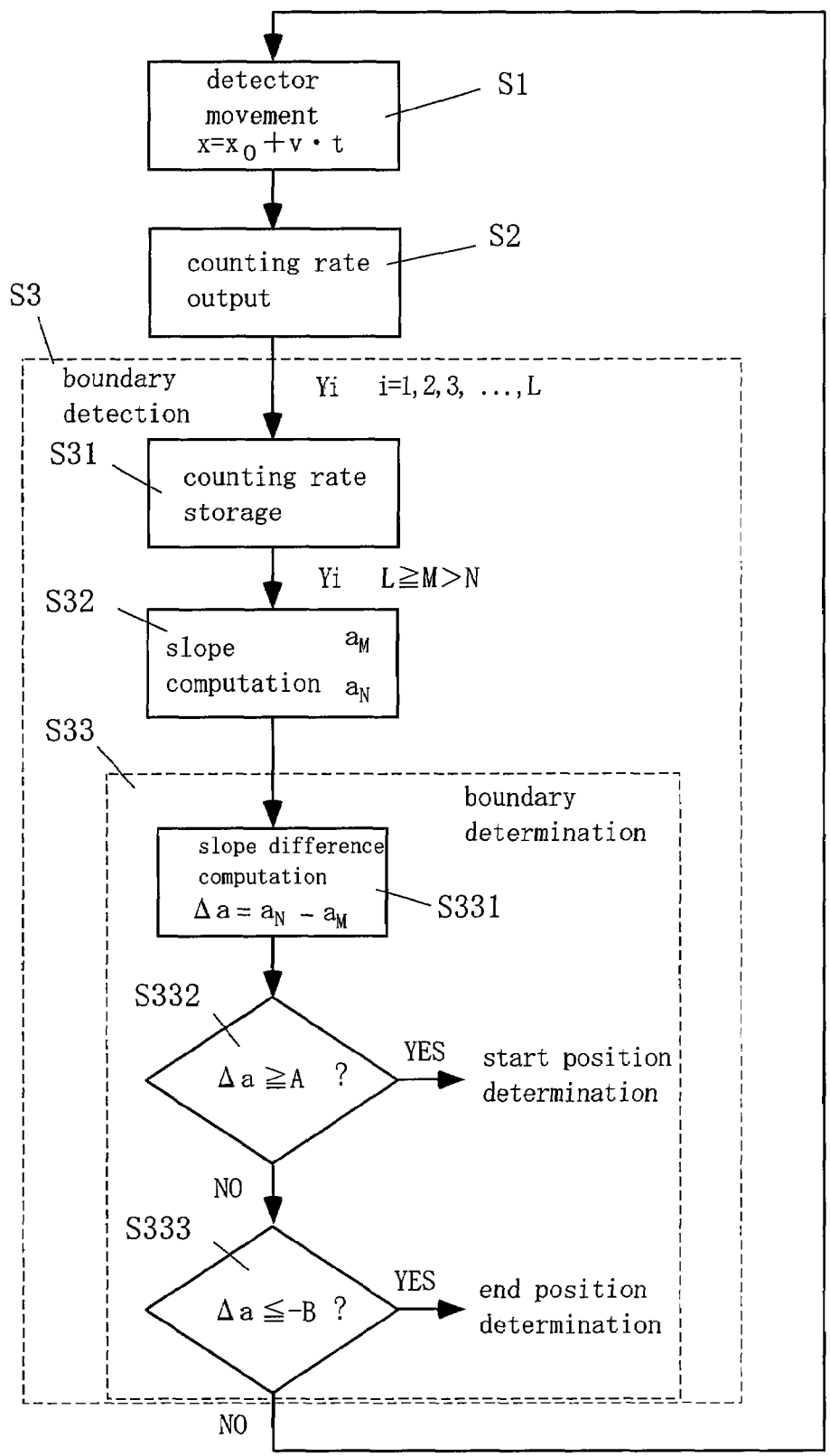
FIG. 10 is an overall flowchart of a surface contamination examining method according to the invention.

FIG. 10 is an overall flowchart of a surface contamination examining method according to the invention. In FIG. 10, the surface contamination examining method of the invention has a detector movement step S1, a counting rate output step S2, and a boundary detection step S3.

In the detector movement step S1, the radiation detector 11 for detecting radiation moves along the surface 18 of the object to be measured at a substantially constant speed. A movement distance x may be expressed by Expression (1) on the basis of an initial position $x_0$, a movement speed v, and a time elapsed t.

$$x = x_0 + v \cdot t \quad (1)$$

In the counting rate output step S2, an output pulse from the radiation detector 11 is processed, and radiation intensity is output in the form of the counting rate $Y_i$ (where i=1, 2, 3, . . . , and L: L is an integer of 3 or larger).

The boundary detection step S3 has a counting rate storage step S31, a slope computation step S32, and a boundary determination step S33.

In the counting rate storage step S31, each time a new counting rate $Y_i$ (where i=1, 2, 3, . . ., and L: L is an integer of 3 or larger) is output, the output counting rate $Y_i$ is sequentially stored.

In the slope computation step S32, each time the new counting rate $Y_i$ is stored, the slopes $a_M$ and $a_N$ of the approximation lines from previous M (where M is an integer of 3 or larger) counting rates $Y_i$ including the final counting rate $Y_M$ and previous N (where N is an integer smaller than M) counting rates $Y_i$ including the final counting rate $Y_M$ are calculated.

The boundary determination step S33 has a slope difference computation step S331, a start position determination step S332, and an end position determination step S333.

In the slope difference computation Step S331, each time the slopes are computed in the slope computation step S32, a slope difference $\Delta a = a_N - a_M$ is computed.

In the start position determination step S332, when the slope difference $\Delta a$ exceeds a predetermined positive threshold value A, a corresponding position is determined as a contamination start position.

In the end position determination step S333, when the slope difference $\Delta a$ exceeds the absolute value of a predetermined negative threshold value −B (that is, the slope difference $\Delta a$ is smaller than the negative threshold value −B), a corresponding position is determined as a contamination end position.

With the boundary determination step S33, it is possible to determine the boundary of contamination of the object to be measured by the radioactive material on the basis of the slopes $a_M$ and $a_N$.

Therefore, with the boundary detection step S3, it is possible to detect the boundary of contamination of the object to be measured by the radioactive material on the basis of a change in the counting rate.

Figure 11:
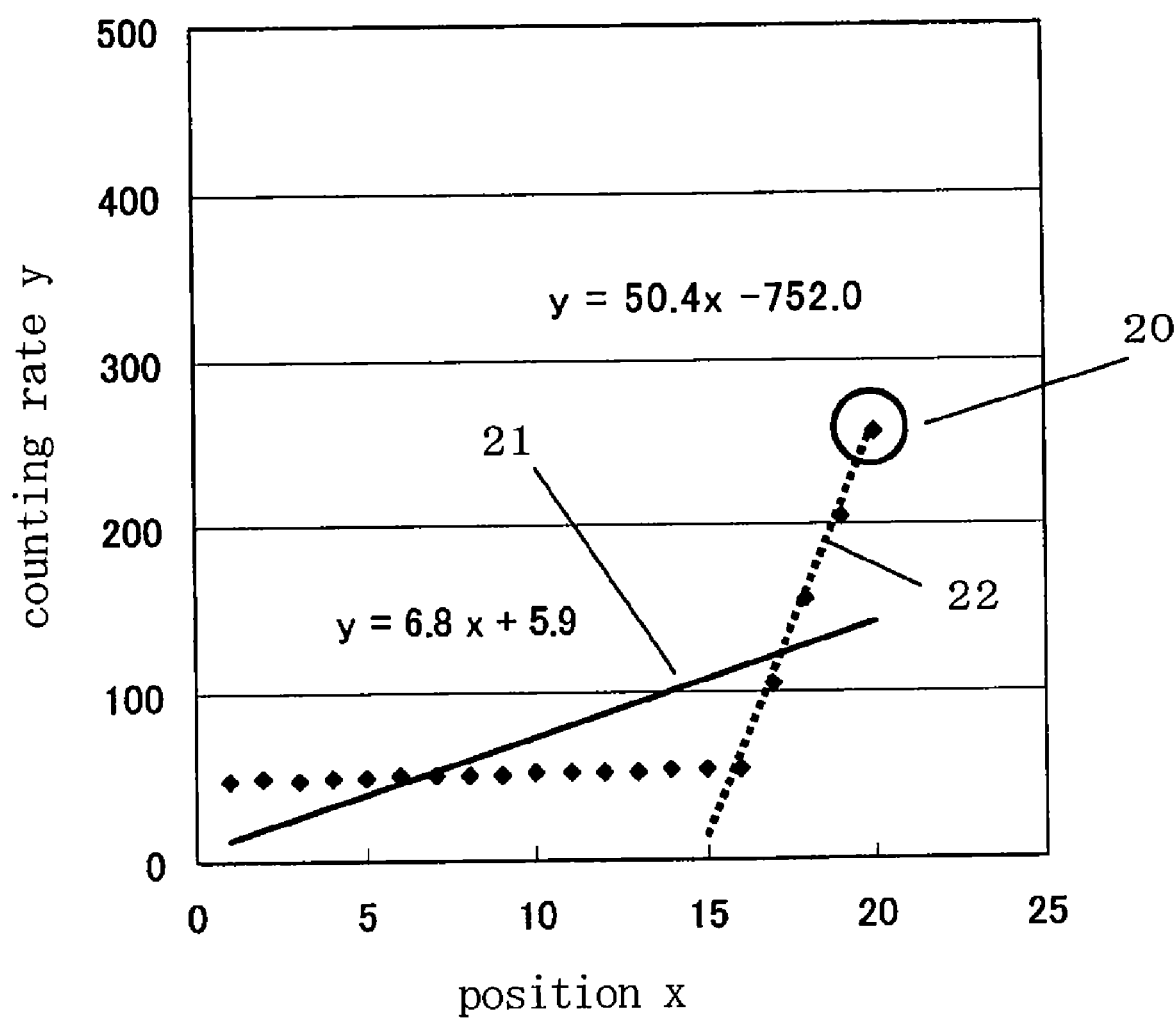
FIG. 11 is a schematic view illustrating a change of a counting rate in the vicinity of a contamination start position.
Figure 12:
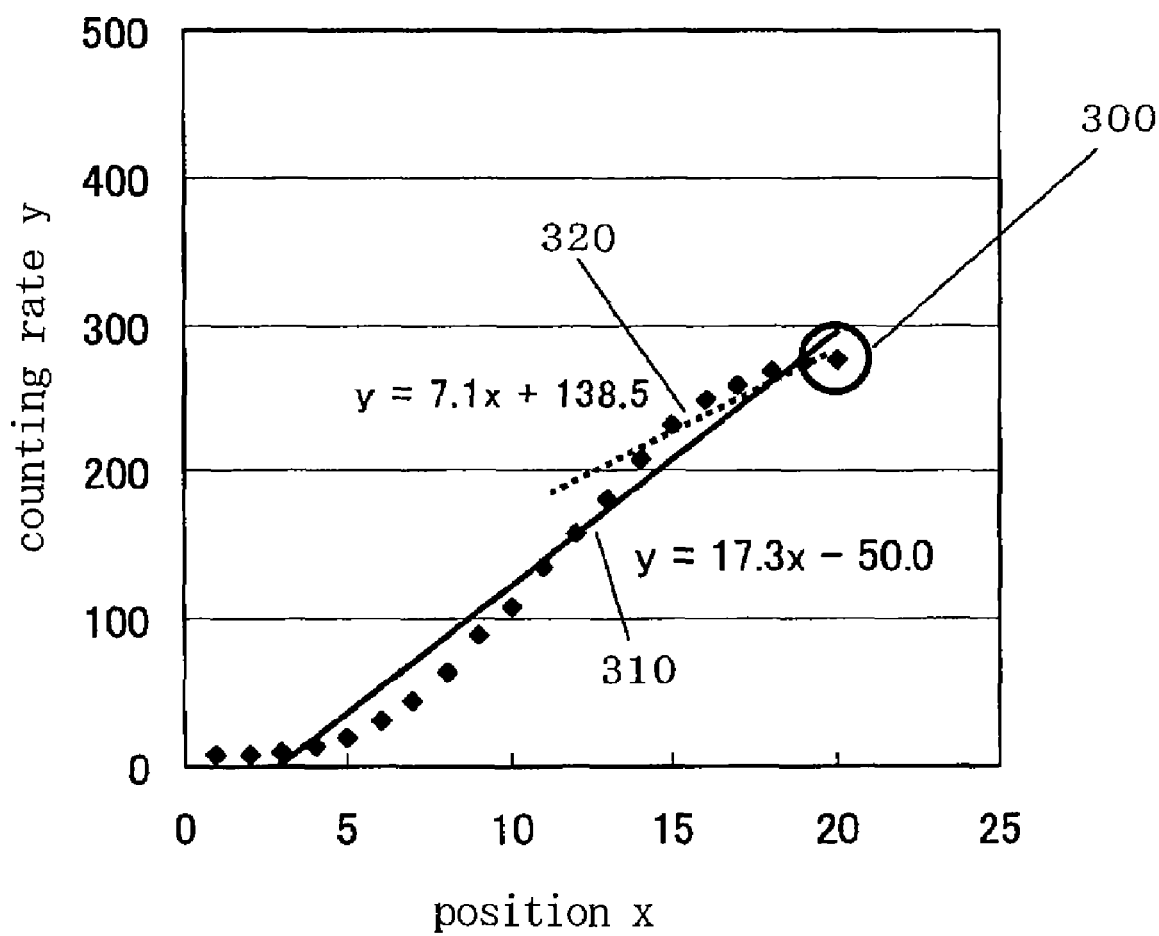
FIG. 12 is a schematic view illustrating a change of a counting rate at an intermediate position.
Figure 13:
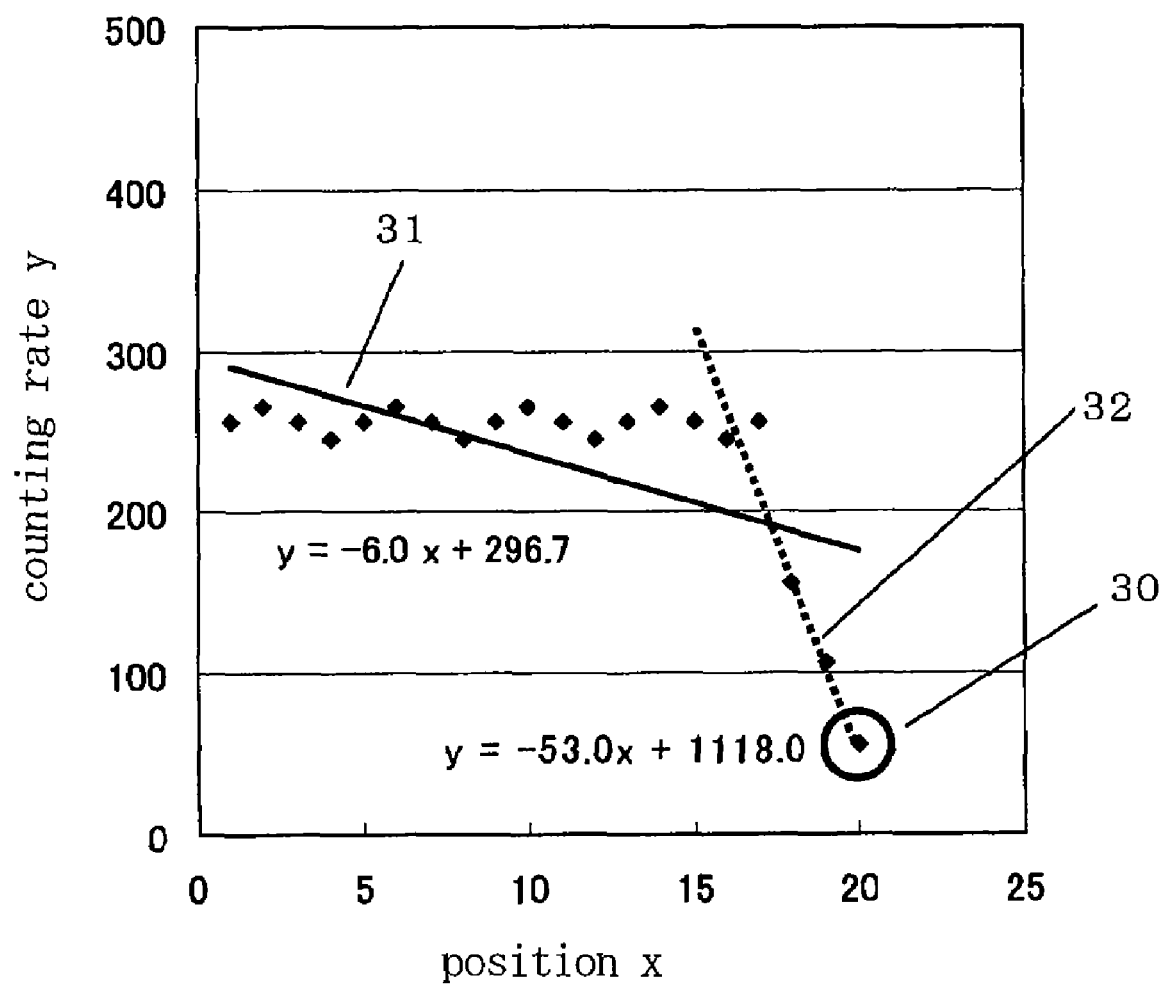
FIG. 13 is a schematic view illustrating a change of a counting rate in the vicinity of a contamination end position.

FIGS. 11, 12, and 13 are schematic views illustrating a change in the counting rate in the vicinity of a contamination start position, an intermediate position, and in the vicinity of a contamination end position, respectively. In these drawings, the horizontal axis corresponds a position x, and each point on the vertical axis corresponds to a counting rate y.

Hereinafter, a method of sampling the counting rate output from the measuring device 13 at a predetermined interval and examining contamination on the basis of sampled data in FIGS. 11 to 13 will be described.

FIG. 11 illustrates data of 20 points in the vicinity of the contamination start position. The horizontal axis x corresponds to a position, and the vertical axis y corresponds to a counting rate. If least squares approximation is linearly applied with respect to previous 20 points including a final point 20 (M=20), a line 21, y=6.8x+5.9, is obtained. Therefore, the slope $a_M$ of the line 21 is 6.8.

If least squares approximation is linearly applied with respect to previous 5 points (N=5) including the final point 20, a line 22, y=50.4x−752.0, is obtained. Therefore, the slope $a_N$ of the line 22 is 50.4.

If the former slope is subtracted from the latter slope, a slope difference $\Delta a = a_N - a_M = 50.4 - 6.8 = 43.6$, that is, the slope difference 43.6 is obtained. For example, when the slope difference A=10 is set as a threshold value, if the resultant slope difference exceeds the threshold value upward, the corresponding point is set as a contamination start position.

The meaning of the above-described method will be described. Even though the background is high or low, the line 21 does not depend on the sizes of the counting rates. When the change is small, the slope is around zero. If the surveymeter reaches the contamination start position, the slope slowly changes from around zero to a positive value. Meanwhile, the line 22 is susceptive to the change. In case of background, like the line 21, the slope is around zero, but if the surveymeter reaches the contamination start position, the line 22 has a positive slope larger than that of the line 21. Therefore, the slope difference obtained by subtracting the slope of the line 21 from the slope of the line 22 has a positive value.

FIG. 12 shows data of 20 points in the vicinity of the end position with contamination lower than a detection surface of the radiation detector 11. If least squares approximation is linearly applied with respect to previous 20 points including a final point 300 (M=20), a line 310, y=17.3x−50.0, is obtained. Therefore, the slope $a_M$ of the line 310 is 17.3.

If least squares approximation is linearly applied with respect to previous 5 points (N=5) including the final point 300, a line 320, y=7.1x+138.5, is obtained. Therefore, the slope $a_N$ of the line 320 is 7.1.

If the former slope is subtracted from the latter slope, the slope difference $\Delta a = a_N - a_M = 7.1 - 17.3 = -10.2$, that is, the slope difference −10.2 is obtained.

The meaning of the above-described method will be described. The line 310 has a positive slope due to response delay even after the surveymeter passes by a contaminated part. Meanwhile, the line 320 is susceptive to the change, and if the surveymeter reaches the contamination end position, the line 320 has a positive slope smaller than the line 310. Therefore, the slope difference obtained by subtracting the slope of the line 310 from the slope of the line 320 has a negative value. As such, even though the counting rate is increasing, if all the contaminated parts are ended, the slope difference clearly has a negative value. FIG. 13 illustrates data of 20 points in the vicinity of the end position with contamination larger, that is, wider than the detection surface of the radiation detector 11. If least squares approximation is applied to determine an approximate line with respect to previous 20 points including a final point 30(M=20), a line 31, y=−6.0x+296.7, is obtained. Therefore, the slope $a_M$ of the line 31 is −6.0.

If least squares approximation is linearly applied with respect to previous 5 points (N=5) including the final point 30, a line 32, y=53.0x+1118.0, is obtained. Therefore, the slope $a_N$ of the line 32 is −53.0.

If the former slope is subtracted from the latter slope, the slope difference $\Delta a = a_N - a_M = -53.0 - (-6.0) = -47.0$, that is, the slope difference −47.0 is obtained. For example, if the slope difference −10 is set as a threshold value −B (where B is an integer), when the resultant slope difference exceeds the threshold value downward, the corresponding point is set as a contamination end position.

The meaning of the above-described method will be described. While the surveymeter is passing through a wide contaminated part, even though the level is high or low, the line 31 does not depend on the sizes of the counting rate. When the change is small, the slope is around zero. In this case, even though the surveymeter reaches the contamination end position, the slope slowly changes from a positive value around zero to a negative value after a predetermined time elapses. Meanwhile, the line 32 is susceptive to the change, and it is experimentally confirmed that if the surveymeter reaches the contamination end position, the line 32 has a positive slope smaller than that of the line 31 or a negative slope whose absolute value is larger than the slope of the line 31. Therefore, the slope difference obtained by subtracting the slope of the line 31 from the slope of the line 32 has a negative value.

As described above, in the invention, a position where the slope difference $\Delta a$ exceeds the positive threshold value A from the below of the graph to the above is set as a contamination start position, and a position where the slope difference $\Delta a$ exceeds a negative set value −B from the above of the graph to the below is set as a contamination end position.

Example 1

A surface contamination having incorporated therein the above-described surface contamination examining method of the invention and an example thereof will be described.

A line having a length of 1500 mm was drawn on a floor 18 of FIG. 9. A weak β radiation source 14 (3700 Bq) being not subject to laws and regulations and made of disc-shaped strontium 90 having a diameter 40 mm and a thickness of 5 mm was placed at a position of 500 mm, thereby setting a contaminated part. The radiation detector 11 having a GM tube was moved from 0 mm to the position of 1500 mm at 50 mm/sec while being spaced at 10 mm from the upper surface of the β radiation source 14. The counting rate (cpm) was sampled by 0.1 second.

Figure 14:
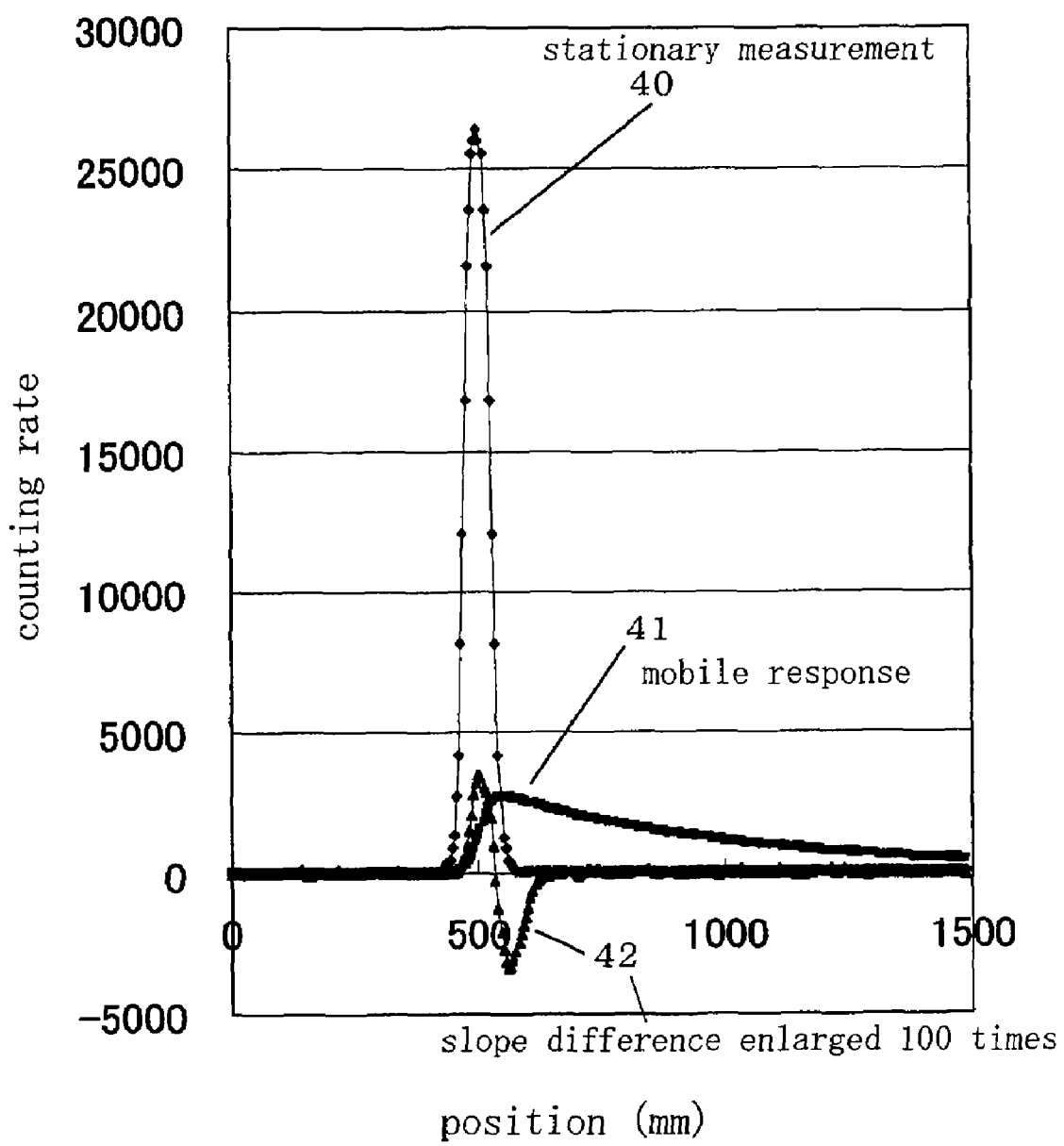
FIG. 14 is a diagram illustrating the operation of a contamination examining device according to the invention.

FIG. 14 is a diagram illustrating the operation of the surface contamination examining device. A graph 41 represents a mobile response. Specifically, the graph 41 represents sampled counting rates. A graph 40 of stationary measurement is obtained by reading an indication value in a stationary state at various positions for 60 seconds, that is, a result of stationary measurement. For ease of comparison, a graph 42 represents a slope difference enlarged 100 times.

Figure 15:
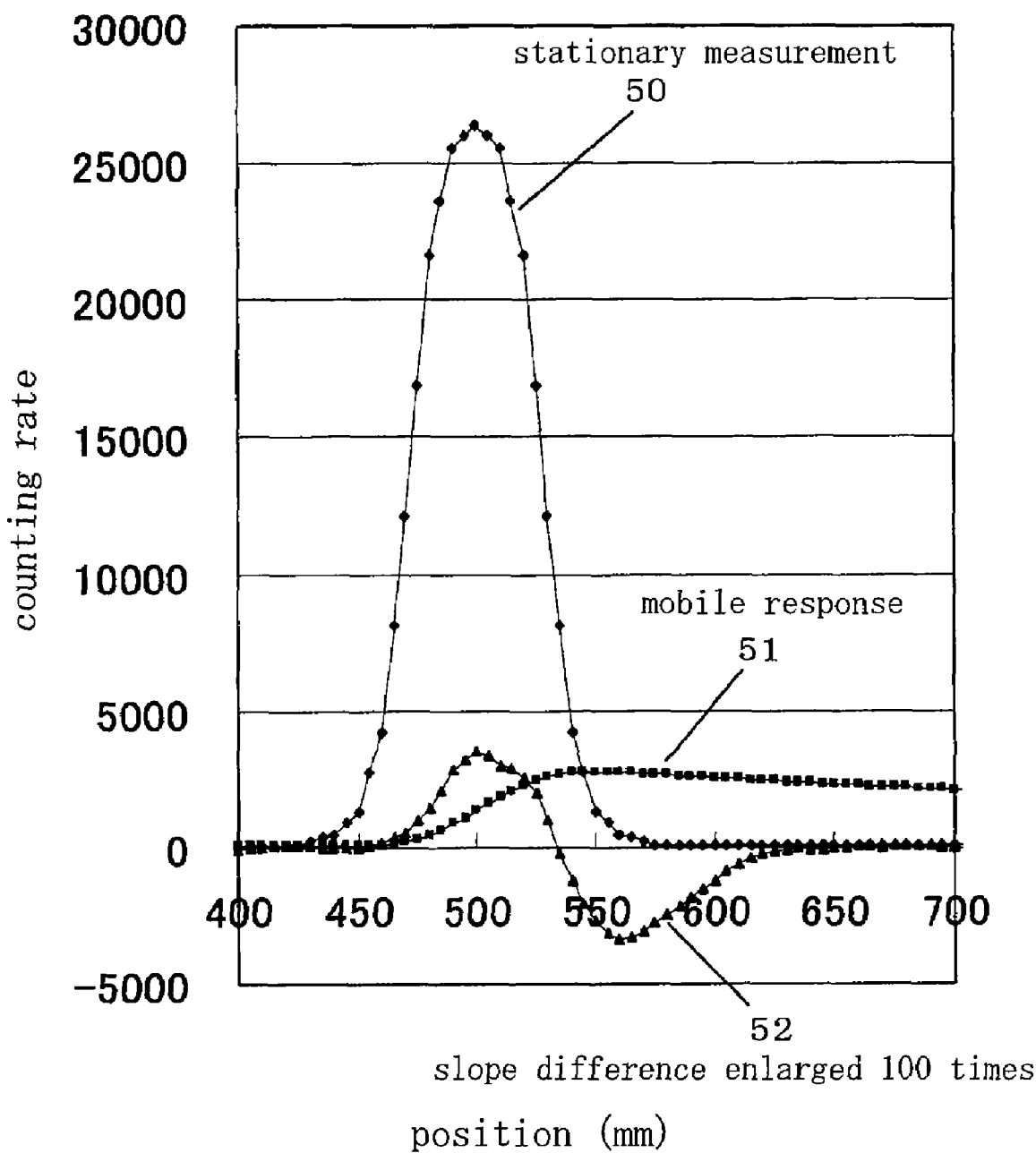
FIG. 15 is a partial enlarged view of FIG. 14 for explaining the detailed operation of the invention.

FIG. 15 is an enlarged view illustrating around 500 mm for explaining the detailed operation of the invention. A graph 51 of mobile response rises after a contamination start position (480 mm), continues to rise after a contamination end position (520 mm), and thereafter slowly decreases. However, at 1500 mm, a value five times larger than the background is obtained. In this case, a time constant indicative of the features of response is set to 10 sec. Although the graph 50 represents stationary measurement, since β rays are emitted from the β radiation source 14 in all directions, a value four times larger than the background is obtained at 430 mm in front of the contamination start position and at 570 mm in the rear of the contamination end position. A graph 52 represents a slope difference.

Figure 16:
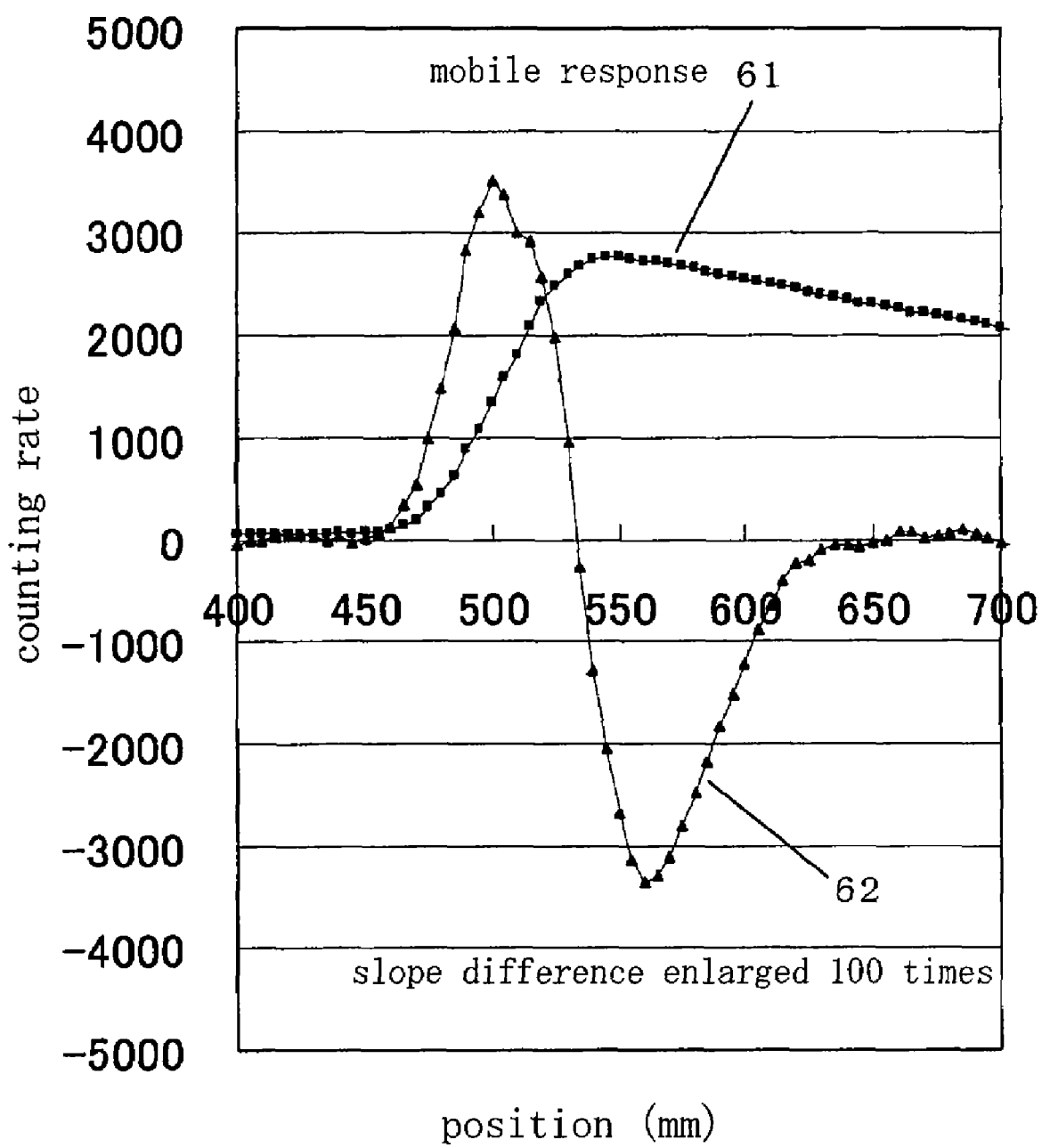
FIG. 16 is a diagram illustrating the relationship between a mobile response in FIGS. 14 and 15 and a slope difference.

FIG. 16 illustrates the relationship between a detailed mobile response and a slope difference. A graph 62 representing a slope difference rises at the substantially same position of a graph 61 of mobile response, and has a maximum value at 500 mm, which is the center of contamination. The graph 62 falls when the graph 61 is rising, and has a negative value at 530 mm.

Figure 17:
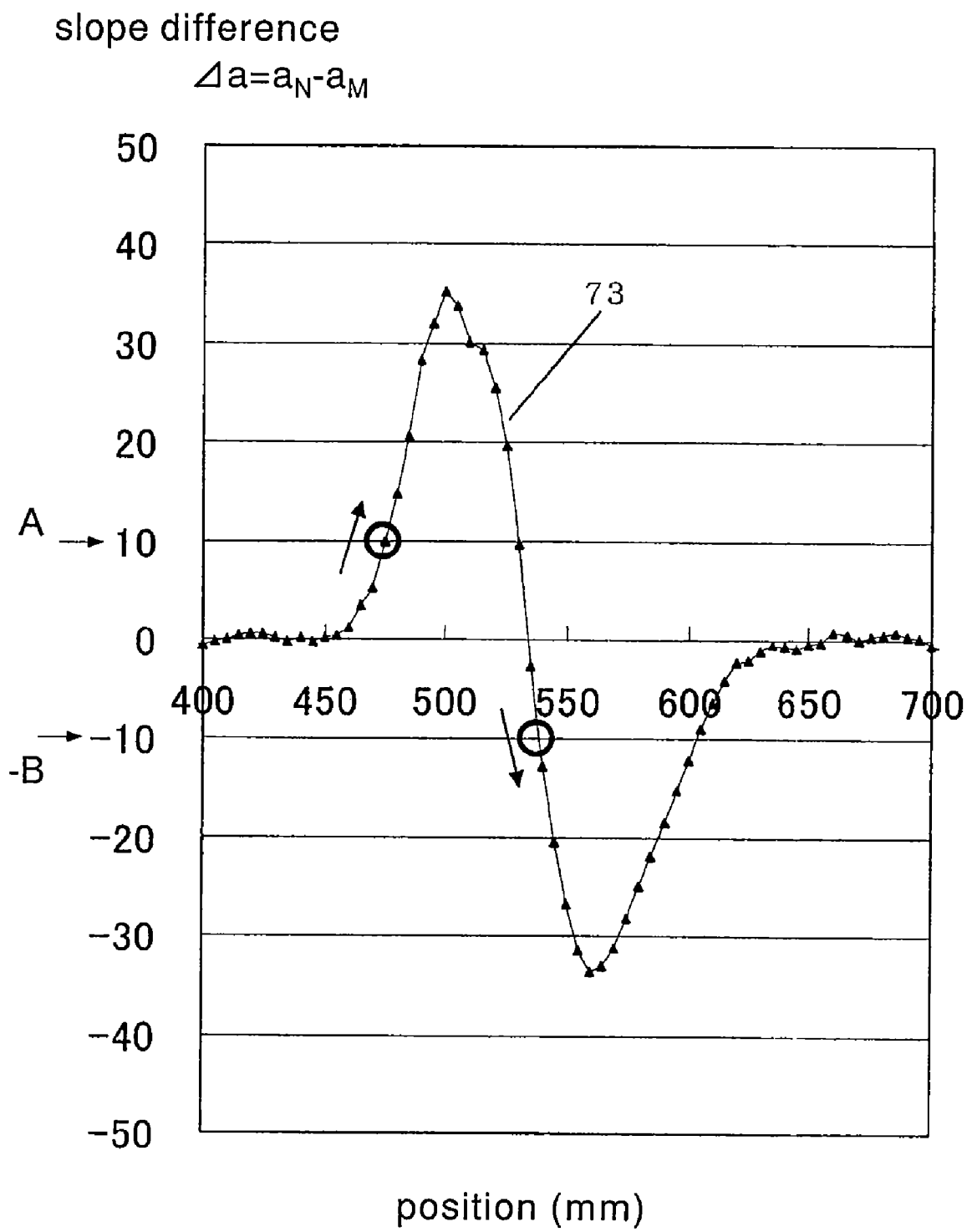
FIG. 17 is an explanatory view of a threshold value in the invention.

FIG. 17 is an explanatory view of a threshold value in the invention. Here, the positive threshold value A is set to 10, and the negative threshold value −B is set to −10. The threshold values are indicated by circles in a graph 73 of the slope difference Δa. A position where the slope difference exceeds the positive threshold value upward as indicated by an arrow is at 475 mm as the contamination start position. A position where the slope difference exceeds the negative threshold value downward as indicated by an arrow is at 530 mm as the contamination end position. That is, sufficient accuracy is achieved, as compared with a case where the actual contamination start position is at 480 mm and the actual contamination end position is at 520 mm. Only with the mobile response, it is difficult to specify the start position and the end position of contamination, in particular, the end position at a time. Therefore, it can be seen that the invention has excellent effects.

The signs of the threshold values A and B may be decided by a threshold value setting dial 15 shown in FIG. 9. When a contamination control level is strict, the absolute values of the threshold values A and B are preferably small. Meanwhile, when a contamination control level is loose, the absolute values of the threshold value are preferably large.

Referring to FIG. 9, the surface contamination examining device of the invention further includes a display device that displays the position of the boundary of contamination of the object to be measured. In this example, the display device includes a light emitter 16 (LED) provided in the radiation detector 11, a light emitter 17 (LED) provided in the measuring device 13, and an alarm 19 (buzzer) provided in the measuring device 13.

The light emitters 16 and 17 are turned on at the contamination start position, kept turned on, and turned off at the contamination end position.

Warning sound may be generated from an alarm 19, such as a buzzer, which is provided in the measuring device 13, at the contamination start position, and may be turned out at the contamination end position.

The light emitters 16 and 17 and the alarm 19 may be used together or alone.

As described above, according to the device and method of the invention, the boundary detecting device 10 is provided to detect the boundary of contamination 14 of the object to be measured by the radioactive material when the radiation detector 11 moves along the surface 18 of the object to be measured at a substantially constant speed. According to the method of the invention using this device, in the detector movement step S1, the radiation detector 11 for detecting radiation moves along the surface of the object to be measured. Next, in the counting rate output step S2, the output pulse from the radiation detector 11 is processed and radiation intensity is output in the form of the counting rate $Y_i$. Next, in the boundary detection step S3, the boundary of contamination 14 of the object to be measured by the radioactive material is detected on the basis of the change in the counting rate $Y_i$.

Therefore, it is possible to specify the boundary (contamination start position and contamination end position) of contamination of the object to be measured at a time, without repeating reciprocation or stop in the vicinity of the boundary.

The invention is not limited to the foregoing embodiment, but various modifications may be made without departing from the scope of the invention.

The invention claimed is:

1. A surface contamination examining device comprising:
   (a) a radiation detector that detects radiation; and
   (b) an arithmetic/display device that processes an output pulse from the radiation detector and displays radiation intensity in the form of a counting rate,
   (c) wherein the arithmetic/display device has a boundary detecting device that detects the boundary of contamination of an object to be measured by a radioactive material when the radiation detector moves along a surface of the object to be measured at a substantially constant speed;
   (d) wherein the boundary detecting device comprises
      (i) a counting rate storage unit containing instructions to sequentially store the counting rate $Y_i$ at a predetermined time interval, wherein i is an integer of 1 or larger;
      (ii) a slope arithmetic unit containing instructions to compute slopes $a_M$ and $a_N$ of approximation lines from M counting rates $Y_i$ in a predetermined range and N counting rates $Y_i$ from among the M counting rates $Y_i$, wherein M is an integer of 3 or larger and N is an integer smaller than M; and
      (iii) a boundary determining unit containing instructions to compare the slopes $a_M$ and $a_N$ to determine the boundary of contamination of the object to be measured by the radioactive material.

2. The device according to claim 1,
wherein the predetermined time interval is a uniform interval.

3. The device according to claim 1,
wherein the boundary determining unit computes a slope difference $\Delta a = a_N - a_m$, when the slope difference $\Delta a$ exceeds a predetermined positive threshold value, a corresponding position is determined as a contamination start position, and when the absolute value of the slope difference $\Delta a$ exceeds a predetermined negative threshold value, a corresponding position is determined as a contamination end position.

4. The device according to claim 1, further comprising:
a display device that displays the position of the boundary of contamination of the object to be measured.

5. The device according to claim 4,
wherein the display device is a light emitter or an alarm or a light emitter and an alarm.

6. A method of examining surface contamination, comprising the steps of:
   (a) moving a radiation detector for detecting radiation along a surface of an object to be measured at a substantially constant speed;
   (b) processing an output pulse from the radiation detector and outputting radiation intensity in the form of a counting rate; and
   (c) detecting the boundary of contamination of the object to be measured by a radioactive material based on a change in the counting rate, wherein the detecting step (c) further comprises the steps of:
      (i) sequentially storing counting rates $Y_i$ at a predetermined time interval where i is an integer of 1 or larger, computing slopes $a_M$ and $a_N$ of approximation lines of M counting rates $Y_i$ in a predetermined range and N counting rates $Y_i$ from among the M counting rates $Y_i$, where M is an integer of 3 or larger and N is an integer smaller than M, and
      (iii) comparing the slopes $a_M$ and $a_N$ to determine the boundary of contamination of the object to be measured by the radioactive material.

7. The method according to claim 6,
wherein the predetermined time interval is a uniform interval.

8. The method according to claim 6,
wherein in determining the boundary of contamination, a slope difference $\Delta a = a_N - a_m$ is computed, when the slope difference $\Delta a$ exceeds a predetermined positive threshold value, a corresponding position is determined as a contamination start position, and when the absolute value of the slope difference $\Delta a$ exceeds a predetermined negative threshold value, a corresponding position is determined as a contamination end position.

* * * * *